(No Model.)
H. B. CURRY.
BOLT AND NUT FASTENING DEVICE.
No. 469,993.                                    Patented Mar. 1, 1892.
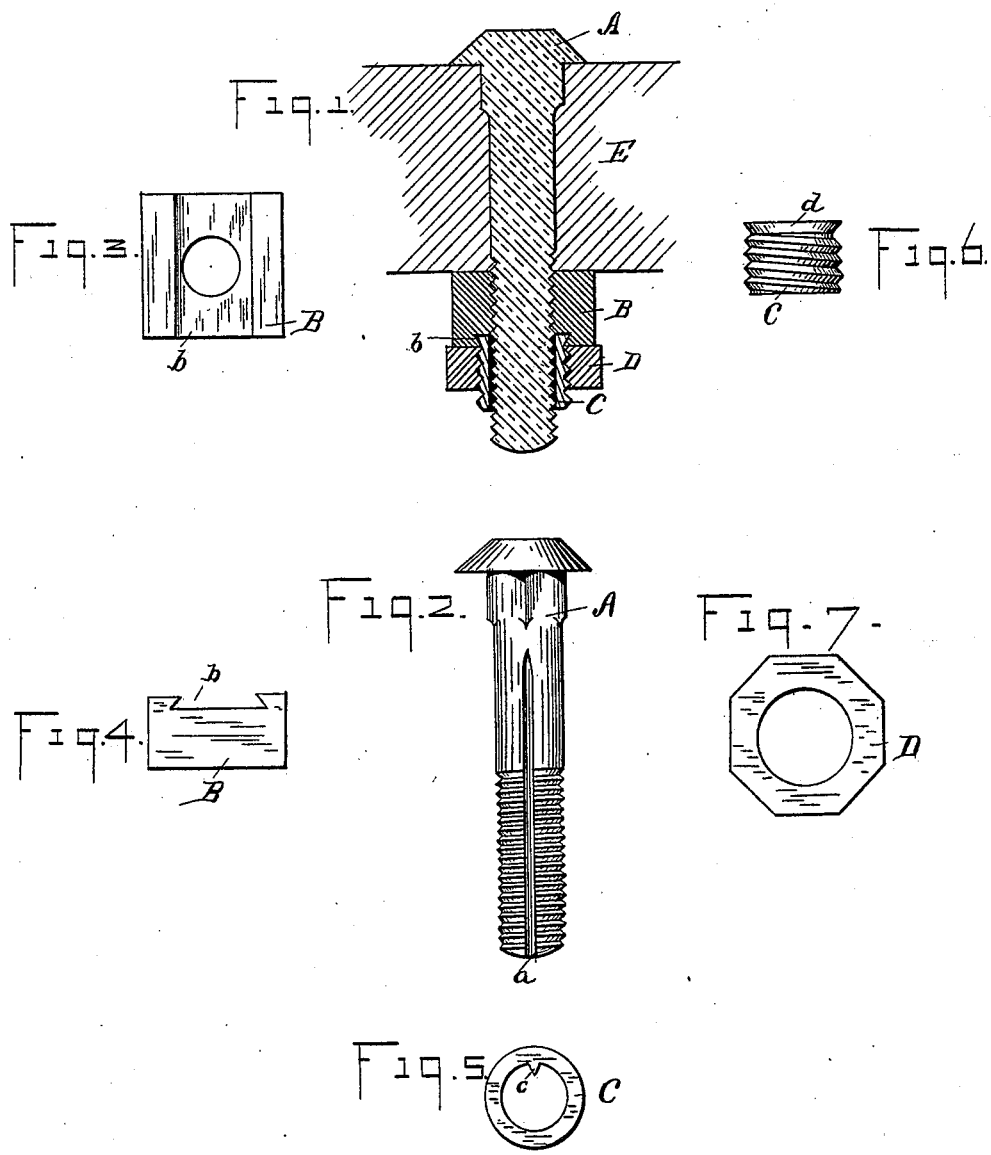

UNITED STATES PATENT OFFICE.

HENRY B. CURRY, OF TROY, WEST VIRGINIA.

BOLT AND NUT FASTENING DEVICE.

SPECIFICATION forming part of Letters Patent No. 469,993, dated March 1, 1892.

Application filed November 18, 1891. Serial No. 412,337. (No model.)

*To all whom it may concern:*

Be it known that I, HENRY B. CURRY, a citizen of the United States of America, residing at Troy, in the county of Gilmer and State of West Virginia, have invented certain new and useful Improvements in Bolt and Nut Fastening Devices, of which the following is a specification, reference being had therein to the accompanying drawings.

My invention relates to improvements in bolts and nuts and the means of locking or fastening them when in use, so that they shall not work loose by vibration or other cause.

It consists in constructing the bolt with a groove across its threads, a nut with a channeled outer surface, a thimble to fit over the bolt and with a lip to fit into the channel and having a ridge or tongue on its inner surface to engage the groove of the bolt, and a second nut to fit the thimble, the threads of the thimble and its nut cut in a direction the reverse of the threads of the bolt and its nut, as herein more particularly described.

In the accompanying drawings, Figure 1 is a section of the device when bolted and locked. Fig. 2 is the bolt with its groove. Fig. 3 is a plan of the nut with its channel. Fig. 4 is a side view of the same. Fig. 5 is a plan of the thimble, showing the ridge or tongue which engages the groove of the bolt. Fig. 6 is a side view of the same. Fig. 7 is a plan of the nut which is fitted to the thimble.

In all figures the same letters refer to the same parts.

Referring to the figures of the drawings, E, Fig. 1, is the material to which the device is applied, as bridge-timbers, iron plates, or any other.

A, Figs. 1 and 2, is the bolt, and $a$ is its groove, of sufficient depth to engage and hold the tongue of the thimble.

B, Figs. 1, 3, and 4, is the nut which has its thread cut to fit the bolt and a channel $b$ in its outer surface, with the sides inclined inward, to receive and hold an end of the thimble.

C, Figs. 1, 5, and 6, is the thimble, the interior diameter of which is of a size to pass over the thread of the bolt, having on its inner surface a longitudinal ridge or tongue $c$, adapted to engage the groove of the bolt. One end of this thimble $d$ is cut to size and shape to slide into the channel of the nut, and, while revolving therein, to be held against pulling out by the inclined sides, and having the outer surface cut with a thread running in a reverse direction from the thread of the bolt.

D, Figs. 1 and 7, is the nut with a thread fitted to the thimble to be screwed up to the nut of the bolt.

The operation of my invention is as follows: The bolt being in place, the thimble is slipped into the channel of the nut and the nut brought to the end of the bolt and screwed on in the usual manner. The tongue of the thimble engaging the groove of the bolt, they are held in line together, and the thimble follows the nut as it is screwed home. The outer nut is now applied to the thimble and screwed home also, and the whole is thus firmly locked.

My invention is not limited, and I do not confine my claim to "bolts" and "nuts," technically so called, and these terms are used for convenience of description.

My invention relates to and I claim, broadly, bolts, screws, rods, and all similar appliances having threaded ends grooved to receive the tongue of a thimble and to all nuts of whatever size or form the surface of which is channeled to receive and hold a thimble and having a second nut fitted thereon as a means of fastening.

Having described and shown my invention, what I claim, and desire to secure by Letters Patent, is—

1. In a device for fastening nuts on bolts, screws, or rods, a thimble of a size to pass over the thread of the bolt, having one end provided with a lip or bevel fitting into and revolving in a channel with sides inclining inward on the outer surface of a nut which is fitted to the thread of the bolt and having a longitudinal ridge or tongue on its inner surface adapted to engage a groove cut across its threads and having its outer surface threaded in a direction opposite to the thread of the bolt to receive an outer nut, substantially as and for the purpose described.

2. A bolt and nut fastening device consisting of a combination of four parts with each other, viz: a bolt, screw, or rod having a groove cut across its threads, a nut fitted to the thread of the bolt and having its outer face provided with a channel with the sides inclined inward, a thimble of a size to pass over the thread of the bolt, with one end fitted as a lip to slide into and revolve in the channel of the nut, having its inner surface provided with a ridge or tongue running lengthwise and adapted to engage the groove of the bolt, and having its outer surface provided with a thread cut in reverse direction to the thread of the bolt, and a second nut fitted to the thread of the thimble, the combination making a complete locking device, substantially as and for the purpose shown and described.

In testimony whereof I have affixed my signature in presence of two witnesses.

HENRY B. CURRY.

Witnesses:
 J. N. BUSH,
 W. H. MESSENGER.